Patented Apr. 10, 1923.

1,451,270

UNITED STATES PATENT OFFICE.

WILLIAM JACKSON POPE, OF HOLMESDALE, CAMBRIDGE, ENGLAND, ASSIGNOR OF ONE-HALF TO SCOTTISH DYES LIMITED, OF CARLISLE, CUMBERLAND, ENGLAND.

PRODUCTION OF COLORING MATTERS.

No Drawing.   Application filed September 17, 1920.   Serial No. 410,913.

*To all whom it may concern:*

Be it known that I, WILLIAM JACKSON POPE, a subject of the King of Great Britain and Ireland, and residing at Holmesdale, Brooklands Avenue, Cambridge, in the county of Cambridge, England, have invented certain new and useful Improvements Relating to the Production of Coloring Matters, of which the following is a specification.

This invention relates to improvements in the manufacture of N-dihydro-1:2:1':2'-anthraquinoneazine and its derivatives.

The blue coloring matter, N-dihydro-1:2: 1':2'-anthraquinoneazine is usually prepared by the action of fused caustic potash on 2-aminoanthraquinone with or without the addition of an oxidizing agent followed by atmospheric oxidation of a solution of the melt.

The present invention has for its object to provide a process giving improved yields of N-dihydro-1:2:1':2'-anthraquinoneazine.

The object of my invention also includes a process for the manufacture of the derivatives of N-dihydro-1:2:1':2'-anthraquinoneazine.

The invention consists in modifying the process referred to above either for the production of N-dihydro-1:2:1':2'-anthraquinoneazine or of its derivatives, by causing the action of fused caustic potash on 2-aminoanthraquinone or its derivatives respectively to take place in the presence of a salt of an organic acid which is miscible in a fused state with the alkali.

The invention also consists in the introduction into the melt at any appropriate stage of an oxidizing agent for the purpose of still further improving the yield and purity of the N-dihydro-1:2:1':2'-anthraquinoneazine or of its derivatives.

The invention also consists in fusing a body containing the group

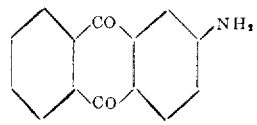

with caustic alkali in the presence of potassium formate and obtaining a coloring matter by subsequent oxidation.

In this specification and claims where I have referred to N-dihydro-1:2:1':2'-anthraquinoneazine without specifically mentioning its derivatives the term is to be read as including such derivatives.

Further, where I have referred to the group

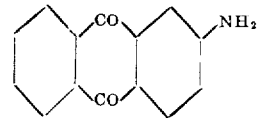

this includes that group with or without one or more hydrogen atoms substituted in the anthraquinone nucleus.

In carrying the invention into effect in one form by way of example, I melt together potassium formate and 2-aminoanthraquinone and subsequently add caustic potash to the molten mass.

I have found that on thus bringing 2-aminoanthraquinone into contact with fused caustic potash at a suitable temperature in the presence of an appropriate molten salt, N-dihydro-1:2:1':2'-anthraquinoneazine is produced in better yield and in a higher state of purity than in the absence of the above mentioned salt. N-dihydro-1:2:1':2'-anthraquinoneazine is not produced in the melt but is formed and precipitated by subsequent air oxidation. I have also found that instead of 2-aminoanthraquinone its simple derivatives may be employed (in which case the derivatives of N-dihydro-1:2:1':2'-anthraquinoneazine are formed). A number of salts of organic acids are known which form homogeneous liquids when melted together with caustic alkali and such mixtures remain liquid at temperatures below those at which the production of N-dihydro-1:2:1':2'-anthraquinoneazine or its derivatives from 2-aminoanthraquinone or its derivatives is brought about by contact with fused caustic potash. Thus, as a further example, potassium acetate may be employed instead of the potassium formate referred to above.

Again, mixtures of two or more suitable salts may be employed, for example, mixtures of potassium formate and potassium acetate, and the action may be very advantageously modified by the presence of water, or other inert solid or liquid diluent for the purpose of lowering the fusing point of the mass.

According to a further modification the process may be carried out by adding 2-aminoanthraquinone or one of its derivatives to a fused mixture of potassium formate or acetate with caustic potash.

Suitable oxidizing agents may be introduced at any appropriate stage into the melt for the purpose of still further improving the yield and value of the produced N-dihydro-1:2:1':2'-anthraquinoneazine or its derivatives.

Having now described my invention, what I claim as new and desire to secure by Letters Patent is:—

1. A process for the manufacture of N-dihydro-1:2:1':2'-anthraquinoneazine which consists in acting on 2-aminoanthraquinone by fused caustic potash in the presence of a salt of an organic acid which is miscible in a fused state with the alkali and subsequently isolating the dyestuff by oxidation.

2. A process as claimed in claim 1, in which potassium formate is employed as the salt of an organic acid.

3. A process as claimed in claim 1, in which mixtures of salts of organic acids are employed.

4. A process as claimed in claim 1, in which an inert diluent is employed in conjunction with the aforesaid bodies.

5. A process as claimed in claim 1, in which an oxidizing agent is introduced into the melt for the purpose of improving the yield and purity of the produced N-dihydro-1:2:1':2'-anthraquinoneazine.

6. A process as claimed in claim 3, in which mixtures of potassium formate and potassium acetate are employed.

7. A process as claimed in claim 1, in which potassium formate is employed as the salt of the organic acid and an inert diluent is used in conjunction therewith.

8. A process as claimed in claim 1, in which potassium formate is employed as the salt of the organic acid and an oxidizing agent is used therewith.

9. The process which consists in fusing 2-aminoanthraquinone with caustic alkali in the presence of potassium formate and subsequently isolating the dyestuff by air oxidation.

10. The process which consists in fusing a body containing the group

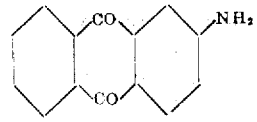

with caustic alkali in the presence of potassium formate and obtaining a coloring matter by subsequent oxidation.

In testimony whereof I have signed my name to this specification.

WILLIAM JACKSON POPE.